(12) United States Patent  (10) Patent No.: US 8,560,750 B2
Sarkar  (45) Date of Patent: Oct. 15, 2013

(54) SYSTEMS AND METHODS FOR ADVANCED INTERRUPT SCHEDULING AND PRIORITY PROCESSING IN A STORAGE SYSTEM ENVIRONMENT

(75) Inventor: Sourin Sarkar, Bangalore (IN)

(73) Assignee: LSI Corporation, San Jose, CA (US)

( * ) Notice: Subject to any disclaimer, the term of this patent is extended or adjusted under 35 U.S.C. 154(b) by 211 days.

(21) Appl. No.: 13/115,260

(22) Filed: May 25, 2011

(65) Prior Publication Data

US 2012/0303850 A1  Nov. 29, 2012

(51) Int. Cl.
*G06F 13/26*  (2006.01)

(52) U.S. Cl.
CPC ...................................... *G06F 13/26* (2013.01)
USPC ............ 710/267; 710/261; 710/265; 710/266

(58) Field of Classification Search
USPC .......................................................... 710/265
See application file for complete search history.

(56) References Cited

U.S. PATENT DOCUMENTS

| | | | | |
|---|---|---|---|---|
| 5,313,640 | A * | 5/1994 | Beardsley et al. ............ | 710/260 |
| 6,915,367 | B2 * | 7/2005 | Gary et al. ..................... | 710/244 |
| 6,957,432 | B2 | 10/2005 | Ballantyne | |
| 7,080,188 | B2 * | 7/2006 | Byers et al. .................... | 710/306 |
| 7,506,091 | B2 * | 3/2009 | Kershaw et al. ............... | 710/266 |
| 7,526,592 | B2 * | 4/2009 | Tsuruta .......................... | 710/268 |
| 7,590,982 | B1 | 9/2009 | Weissman | |
| 7,613,860 | B2 * | 11/2009 | Clark et al. .................... | 710/260 |
| 7,617,345 | B2 * | 11/2009 | Clark et al. .................... | 710/260 |
| 7,660,927 | B2 * | 2/2010 | Clark et al. .................... | 710/200 |
| 7,793,025 | B2 | 9/2010 | Ehrlich et al. | |
| 2004/0199695 | A1 * | 10/2004 | Purdham et al. .............. | 710/269 |
| 2005/0193260 | A1 | 9/2005 | Kato | |
| 2005/0216635 | A1 | 9/2005 | Nishimura | |
| 2008/0082700 | A1 | 4/2008 | Ogawa | |
| 2008/0082713 | A1 * | 4/2008 | Tsuruta ......................... | 710/268 |
| 2008/0276133 | A1 | 11/2008 | Hadley et al. | |
| 2008/0294826 | A1 * | 11/2008 | Clark et al. .................... | 710/264 |
| 2009/0013118 | A1 * | 1/2009 | Clark et al. .................... | 710/265 |
| 2009/0013119 | A1 * | 1/2009 | Clark et al. .................... | 710/265 |

FOREIGN PATENT DOCUMENTS

WO  WO 2009003903 A1 *  1/2009  .............. G06F 13/24

* cited by examiner

*Primary Examiner* — Ryan Stiglic
(74) *Attorney, Agent, or Firm* — Duft, Bornsen & Fettig LLP (57) ABSTRACT

Methods and systems for advanced interrupt processing and scheduling are provided. The system comprises a memory operable to store interrupt priorities, an interface, and a processor operable to acquire incoming interrupts and to handle the incoming interrupts according to the interrupt priorities. The processor is also operable to receive interrupt processing criteria from the interface (sent, for example, from a device not directly coupled with the system), and to modify the interrupt priorities of the memory based upon the interrupt processing criteria without losing incoming processing requests for the system. Additionally, the processor is operable to process the incoming interrupts according to the modified interrupt priorities responsive to modifying the interrupt priorities.

17 Claims, 7 Drawing Sheets

SYSTEMS AND METHODS FOR ADVANCED INTERRUPT SCHEDULING AND PRIORITY PROCESSING IN A STORAGE SYSTEM ENVIRONMENT

BACKGROUND

1. Field of the Invention

The invention relates generally to storage systems and more specifically relates to interrupt processing in a storage system environment.

2. Discussion of Related Art

Generally, a storage controller is used to manage the devices of a storage system (e.g., storage disks, interfaces, etc.). A storage controller may include, for example, a host bus adapter for coupling a host system to one or more storage devices. The storage controller may also include a controller device embedded within a storage system. A storage controller typically comprises a processor/CPU coupled with a plurality of storage devices (e.g., hard disks, flash memory, etc.) through appropriate interfaces. The processor performs read or write requests from a host system that are directed to the storage devices. In addition, further interfaces may be coupled with the processor of the storage controller for communication with host systems. Each of these interfaces may cause the storage controller to generate a signal indicating a need for intervention by the processor. The storage controller itself may also internally generate such signals (e.g., owing to DMA signaling, timer circuits, etc.). Incoming signals are often coupled to an "interrupt" input signal of the processor, so as to cause the processor to interrupt its present processing task and service the needs of the interrupting interface or circuit. To aid in coordinating processing of multiple such interrupt sources, a storage controller often uses a Programmable Interrupt Controller (PIC) or Advanced PIC (APIC), although some controllers may rely only on features of the processor to provide such coordination. The PIC (or an internal feature of the processor) provides priority information for each possible source of an interrupt request signal sent to the processor. This may be achieved, for example, by receiving interrupts at the PIC, and multiplexing the interrupts to generate an interrupt signal for the processor, based upon a priority scheme at the PIC. Thus, higher priority interrupts may be enabled while a lower priority interrupt is being processed.

Prioritized interrupt processing is generally desirable because it allows a storage controller to process mission-critical interrupts quickly (e.g., interrupts relating to critical errors, data throughput, etc.) while also reducing the impact of low-priority interrupts (e.g., monitoring or debugging interrupts) on system overhead for the storage system. As presently practiced, interrupt priorities are defined for a storage controller at the "hardcoded" firmware level (i.e., fixed data in a hardware device or otherwise compiled into machine-code). Firmware may exist, for example, in microcode or machine code resident in a program memory coupled with the processor. Thus, the order of interrupt scheduling and priority processing for a given storage controller cannot be changed during the run time or life cycle of the firmware for the storage controller, because the entire firmware must be replaced to change an interrupt priority. Replacing or updating the firmware typically requires that the storage controller be taken offline while the firmware is modified, and further requires that the storage controller be re-initialized with the new firmware. This is undesirable, as it may result in a long period of time while the storage controller and associated storage devices are unavailable to a host system.

In addition to problems associated with taking a storage controller offline, the firmware development process used to modify existing firmware is associated with several known pitfalls. For example, installing new firmware at an interrupt controller may result in integration issues with other components of the storage system or with components coupled with the storage system. Thus, even when implementing only minor changes in firmware, development generally requires extensive testing in a pre-production integration laboratory in order to ensure that the new firmware is error-free and compatible with other components and systems. The development and testing problems can be exacerbated when the storage controller is implemented by a manufacturer in a wide variety of different storage system configurations for a variety of customers, because there are a greater number of potential incompatibilities. Unfortunately, different customers may have different processing and data management priorities for a given storage system configuration which will impact the preferred interrupt priorities for that system. A manufacturer therefore may have to test a wide variety of configurations of a system even for a small change to the firmware relating to interrupt priorities.

Thus it is an ongoing challenge to manage the priorities of interrupts in a storage system according to the varying demands of storage system customers.

SUMMARY

The present invention solves the above and other problems, thereby advancing the state of the useful arts, by providing methods and systems for improved, dynamic, run-time interrupt priority management in a storage system environment. These systems may include host bus adapters, expanders, and other storage system devices. In one aspect hereof, a storage system comprises a memory operable to store interrupt priorities, an interface, and a processor. The processor is operable to acquire incoming interrupts and to process the incoming interrupts according to the interrupt priorities. The processor is also operable to receive interrupt processing criteria from the interface, and to modify the interrupt priorities in the memory based upon the interrupt processing criteria without losing incoming processing requests for the storage system. Additionally, the processor is operable to handle the incoming interrupts according to the modified interrupt priorities responsive to modifying the interrupt priorities.

Another aspect hereof provides a method. The method includes receiving, with a processor of a storage controller, incoming interrupts, and processing, with the processor, the incoming interrupts according to interrupt priorities stored in a memory. The method further includes receiving, with an interface, input describing interrupt processing criteria, and transmitting, via the interface, the interrupt processing criteria to the processor. The method further includes receiving, with the processor, the interrupt processing criteria, and modifying, with the processor, the interrupt priorities stored at the memory based upon the interrupt processing criteria without losing incoming processing requests for the storage controller. Additionally, the method includes processing, with the processor, the incoming interrupts according to the modified interrupt priorities, responsive to modifying the interrupt priorities.

DETAILED DESCRIPTION OF THE DRAWINGS

Figure 1:
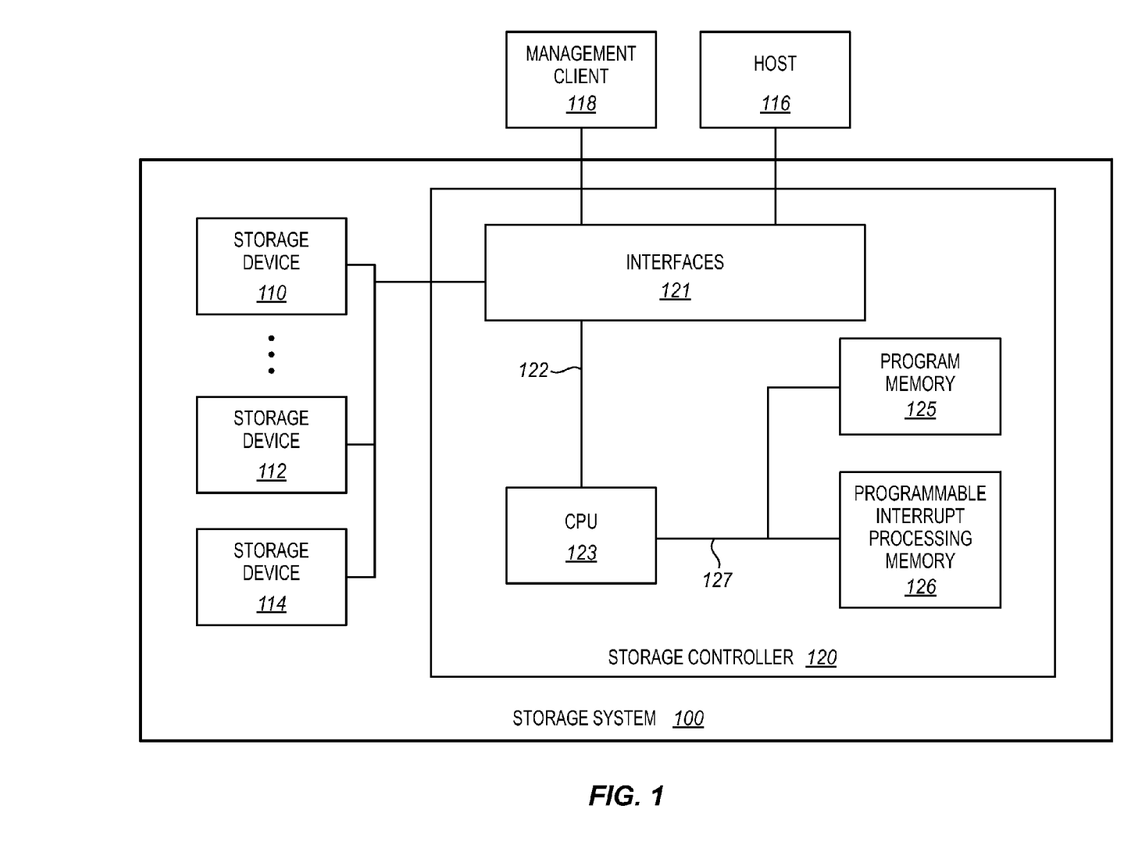
FIG. 1 is a block diagram of an exemplary storage controller of a storage system in accordance with features and aspects hereof.

FIG. 1 is a block diagram of an exemplary storage controller 120 of a storage system 100 in accordance with features and aspects hereof. Storage system 100 represents any combination of storage devices and control systems utilized to implement data storage. In this embodiment, storage system 100 comprises storage controller 120 communicatively coupled with storage devices 110-114. In this embodiment, storage system 100 is in communication with host 116 and management client 118.

Utilizing storage system 100 described in detail below, an operator may alter interrupt priorities for a CPU 123 of storage controller 120 dynamically, without a need for storage controller 120 to shut down, re-boot, or otherwise experience noticeable down-time. This in turn provides a benefit because incoming signaling from host 116 and management client 118 will not be "dropped" by storage controller 120.

Storage devices 110-114 may comprise any known storage devices. For example, storage devices 110-114 may comprise devices compliant with standards for Serial Attached SCSI (SAS), Serial Advanced Technology Attachment (SATA), etc. Backplanes or cables may communicatively couple interfaces 121 of storage controller 120 with storage devices 110-114.

Host 116 comprises any system, component, or device operable to provide requests to storage controller 120 that direct storage controller 120 to perform read and/or write operations on any of storage devices 110-114. Management client 118 comprises any system, component, or device operable to perform management functions (e.g., auditing, debugging, etc.) upon storage controller 120. Management client 118 may be integrated into host 116, or may be an independent component. Storage system 100 may be communicatively coupled with any number of hosts, management clients, and storage devices.

In this embodiment, storage controller 120 comprises multiple interfaces 121, in communication with a CPU 123 via a bus 122. Interfaces 121 (also referred to herein as a type of "interrupt source") of storage controller 120 are operable to receive incoming requests and signaling from the components that they are coupled with, and to generate interrupt signals based upon these received requests. Storage controller 120 may comprise, for example, a host bus adapter, or a remote switching device (i.e., an expander) that may be reprogrammed using Serial Management Protocol (SMP) messages. In one embodiment, interfaces 121 may comprise interfaces for storage devices 110-114, host 116, and management client 118. While in operation, signaling from interfaces 121 causes storage controller 120 to generate interrupts indicating a request for processing by CPU 123. The generated interrupts are sent to CPU 123 via bus 122. Interrupt sources may also include other circuits to assist operation of CPU 123. For example, timer circuits, DMA circuits, RAID assist circuits, virtualization assist circuits, etc. Bus 122 may be any suitable commercially available or custom bus and communication protocol for interacting with CPU 123.

CPU 123 comprises any processor capable of processing incoming interrupts generated by interfaces 121. CPU 123 performs operations within storage system 100 according to instructions provided in program memory 125. Based upon the interrupts handled by CPU 123, storage controller 120 may send messages out to storage devices 110-114, to host 116, or other components of storage system 100.

Program memory 125 may comprise any suitable memory to store the instructions and data for execution by CPU 123 (e.g., ROM, programmable ROM, flash memory, etc.). Program memory 125 communicates with CPU 123 via a bus 127. Bus 127 may be any suitable commercially available or custom bus and protocol for coupling CPU 123 with program memory 125.

Storage controller 120 further comprises programmable interrupt processing memory 126 (hereinafter, "interrupt memory 126") that is distinct from program memory 125. Interrupt memory 126 may comprise any known memory device or system (e.g., a disk drive, flash storage, optical storage, RAM, etc.). In one embodiment, interrupt memory 126 is stored on an entirely separate device from program memory 125.

It will be appreciated that it is not generally desirable to manipulate the compiled instructions in program memory 125 without re-compiling new instructions, shutting down storage controller 120, and then re-initializing storage controller 120 with new compiled firmware. This results in undesirable periods of "down-time," wherein a storage controller would be incapable of processing incoming host requests. Furthermore, it will be appreciated that changes to compiled instructions in program memory 125 may have an unpredicted (and potentially unstable) impact upon the operation of CPU 123 as it processes various incoming requests. However, utilizing interrupt memory 126, interrupt priorities may be altered without harming currently existing firmware of storage controller 120 in the following manner.

While in operation, storage controller 120 is operable to receive a directive from outside of storage system 100 and to alter interrupt processing priorities. The directive comprises interrupt processing criteria that modifies the contents of interrupt memory 126 when processed by CPU 123. The directive may be received at one of interfaces 121 (e.g., an interface for management client 118), and interfaces 121 may transmit the interrupt processing criteria to CPU 123 for processing. Interrupt processing criteria may exist in any number of formats. For example, interrupt processing criteria may explicitly indicate a set of interrupts and associated priorities to CPU 123. Manipulating interrupt memory 126 instead of program memory 125 beneficially eliminates problems that are associated with altering priorities that are "hard-coded" (e.g., compiled) in operational firmware, because the priorities in interrupt memory 126 may be manipulated without any need to alter or replace the firmware of storage controller 120. This in turn eliminates any need to halt system operations while re-initializing with new firmware. Thus, incoming requests may continue to be handled or otherwise processed by CPU 123 without stopping operations at storage controller 120 or otherwise taking storage controller 120 offline during the manipulation of interrupt priorities.

While the processing of incoming interrupts may be briefly queued (e.g., by being loaded into a temporary buffer) during alteration of interrupt memory 126 and/or activation of the new interrupt priorities for use in processing, this does not require a shutdown and re-initialization of storage controller 120. In one embodiment, the firmware of storage controller 120 alters the interrupt memory by applying the changes at the first detected idle time of the controller CPU. Alternatively, it may be desired to patch the existing interrupt priorities with the newly desired priorities immediately—in these cases, there be a slight "jitter" or pause in the current operation depending on the type of interrupt priorities being patched. Thus, "on the fly" alterations can be made to interrupt priorities for a customer without the significant costs associated with altering firmware for storage controller 120.

It will be understood that in a first embodiment, no PIC is used by storage controller 120. Instead, CPU 123 polls interrupt priority information in interrupt memory 126 each time an interrupt is received from an interrupt source. After determining the priority of the incoming interrupt, CPU 123 determines whether the priority is higher or lower than the current processing task, and therefore either queues the incoming interrupt, or interrupts its current processing task in order to process the interrupt. Thus, CPU 123 eliminates the need for a PIC by individually looking up each incoming interrupt and correlating it to interrupt priorities stored in interrupt memory 126.

Figure 2:
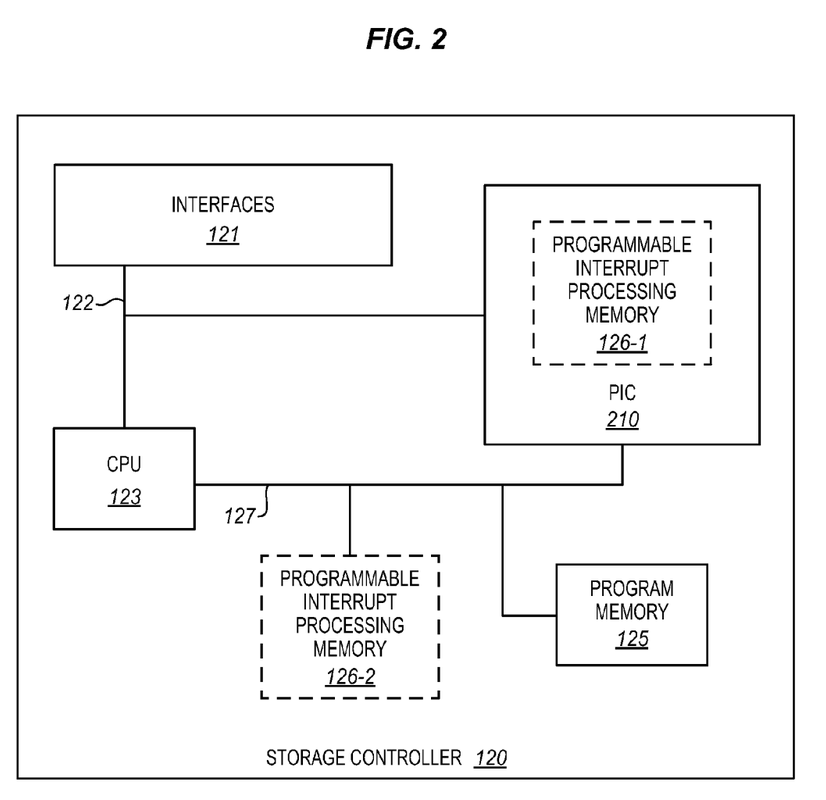
FIG. 2 is a block diagram illustrating further details of an exemplary storage controller in accordance with features and aspects hereof.

FIG. 2 illustrates a second and a third embodiment of an exemplary storage controller 120 configured to utilize a Programmable Interrupt Controller (PIC) 210 in accordance with features and aspects hereof. PIC 210 may be communicatively coupled with bus 122 and bus 127 so that it may receive interrupt signals from storage controller 120 via bus 122 and provide interrupt signals sorted by priority to CPU 123 for processing via bus 127. For example, PIC 210 may multiplex interrupt signaling from storage controller 120 according to the interrupt priorities stored in memory registers in order to generate an interrupt signal applied to the CPU 123. Several embodiments will now be discussed with regard to PIC 210 of FIG. 2.

In the second embodiment, interrupt memory 126-1 comprises memory registers of PIC 210. The memory registers of PIC 210 are reprogrammed in response to receiving the interrupt processing criteria at CPU 123. In this manner, CPU 123 uses the interrupt processing criteria to implement a direct change to the memory registers of PIC 210, thereby reprogramming the order in which PIC 210 presents incoming interrupt signals to CPU 123.

In the third embodiment, interrupt memory 126-2 is distinct from memory registers of PIC 210. In this embodiment, after interrupt memory 126-2 is modified based upon the interrupt processing criteria, the changes in interrupt memory 126-2 are suitably programmed into memory registers of PIC 210. In this manner, changes to interrupt memory 126-2 are used to reprogram PIC 210 (or any combination of PICs used by storage controller 120), thereby altering the order in which incoming interrupts are provided to CPU 123 by PIC 210.

Figure 3:
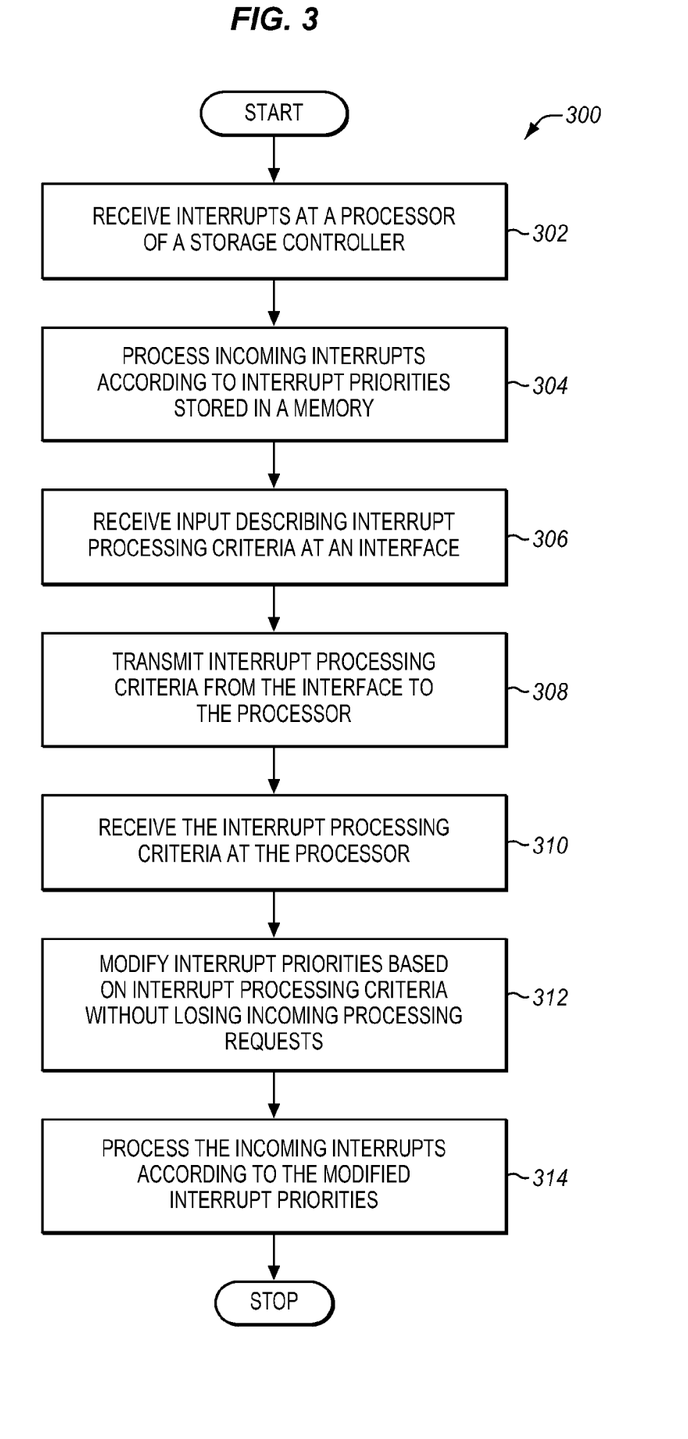
FIG. 3 is a flowchart describing an exemplary method in accordance with features and aspects hereof to perform advanced interrupt scheduling and priority processing.

FIG. 3 is a flowchart describing an exemplary method 300 in accordance with features and aspects hereof to perform advanced interrupt scheduling and priority processing. The method of FIG. 3 may be operable in a storage system such as described above with regard to FIGS. 1-2. In step 302, a processor receives incoming interrupts. Interrupts may be generated, for example, by a storage controller that houses the processor. Interrupts are typically generated based upon signaling received from storage devices, a host, a management client, etc. Generated interrupts will typically be forwarded to the processor via a PIC or similar device.

In step 304, the processor handles/processes the incoming interrupts according to interrupt priorities stored in an interrupt memory. The interrupt memory may store, for example, a table with entries for each type of processing interrupt and an associated priority for each of the processing interrupts. In one embodiment, the interrupt memory comprises memory registers of a PIC.

In step 306, an interface of the storage system receives input describing interrupt processing criteria from a host and/or a management client. For example, the input could comprise a set of interrupts and associated priorities to replace those existing in interrupt memory. In a further embodiment, the input could comprise a request to modify specifically listed interrupts and priorities in interrupt memory. In a still further embodiment, the input could identify one of multiple predefined sets of interrupts and priorities already stored in interrupt memory. These lists may be identified based upon a user name or identifier for a manufacturer, a configuration of the storage system, etc.

In step 308, the interface transmits the interrupt processing criteria to the processor. The interrupt processing criteria may, for example, be passed by the interface to the processor via a bus or similar architecture.

In step 310, the processor receives the interrupt processing criteria and prepares to modify interrupt priorities. Thus, the processor may prepare to replace existing priorities in interrupt memory, to modify individual priorities in interrupt memory, or to select a new set of predefined priorities in interrupt memory. In one embodiment, a program memory for the processor includes instructions that restrict the ability of other network elements to modify interrupt processing priorities in interrupt memory. For example, it may be beneficial to only allow certain devices (e.g., management devices) to modify interrupt priorities, or it may be beneficial to only allow interrupt priorities to be modified if a specific password or code is provided to the storage controller.

In step 312, the processor modifies interrupt priorities without shutting down or otherwise re-initializing the storage controller (i.e., without taking the storage controller "offline"). Thus, the processor may replace existing priorities in interrupt memory, modify individual priorities in interrupt memory, or select a new set of predefined priorities in interrupt memory by modifying a pointer in interrupt memory. This allows the storage controller to modify interrupt priorities without losing incoming processing requests from the storage system. The processor achieves this goal by altering and activating the interrupt priorities stored in the interrupt memory and not altering the "hardcoded" firmware instructions stored in program memory. Because the interrupt priorities are stored separately from the compiled firmware that provides instructions to the processor, the storage controller is operable to continue operating even as the interrupt priorities are modified.

In step 314, the processor processes incoming interrupts according to the modified interrupt priorities.

Using the method described above, a storage controller may advantageously adjust interrupt priorities and/or other interrupt parameters dynamically without the need to go offline while firmware is adjusted. This also allows the storage controller to compensate for interrupt processing changes in a system "on the fly" if desired by a field support engineer or a customer of the manufacturer. Additionally, using sets of interchangeable interrupt priorities (such as priority lists) makes it easier for a developer/manufacturer of storage controllers to implement storage controllers that may be integrated into a variety of different storage system environments.

EXAMPLES

In the following examples, additional processes, systems, and methods are described in the context of advanced interrupt scheduling in a storage system environment.

In one embodiment, interrupt memory 126 comprises one or more sets of interrupt priorities (e.g., Interrupt Priority Lists (IPLs)) that may be accessed by CPU 123. Each priority list describes a set of interrupts, and also describes a priority level for each of those interrupts. Thus, an entirely new set of interrupt priorities may be implemented when CPU 123 selects a new IPL. The interrupt processing criteria may direct CPU 123 to select a new IPL by manipulating a pointer in interrupt memory 126 that points to one of the IPL's.

In one embodiment, CPU 123 selects an IPL based upon the interrupt processing criteria. In a further embodiment, CPU 123 may add to or remove interrupts from an existing IPL, based upon the received interrupt processing criteria. In a further embodiment, CPU 123 may use the interrupt processing criteria to generate an entirely new IPL for use by storage controller 120.

In a still further embodiment, a manufacturer may support a variety of configurations of the storage system. Some configurations for the storage system may include optional elements that other configurations do not. To address this issue, an IPL may be identified/selected by CPU 123 based upon the configuration of storage system 100. Interrupt memory 126 may include an IPL for each expected configuration of the storage controller 120 or storage system 100. For example, there may be an IPL for use with initiator/target environments (i.e., wherein storage controller 120 acts as both a SAS initiator and a SAS target, using SAS for both host and storage device interactions), an IPL for use with integrated RAID environments (i.e., wherein storage controller 120 is an integrated RAID component), and an IPL for use with SAS target only environments (e.g., wherein storage controller 120 acts only as a SAS target for host interaction, while using other protocols for storage device communication). In a further embodiment, each IPL may be associated with a specific type of storage system vendor. In this manner, an IPL may be selected for use with storage controller 120 based upon the identity of the storage system vendor that storage controller 120 will be provided to.

Figure 4:
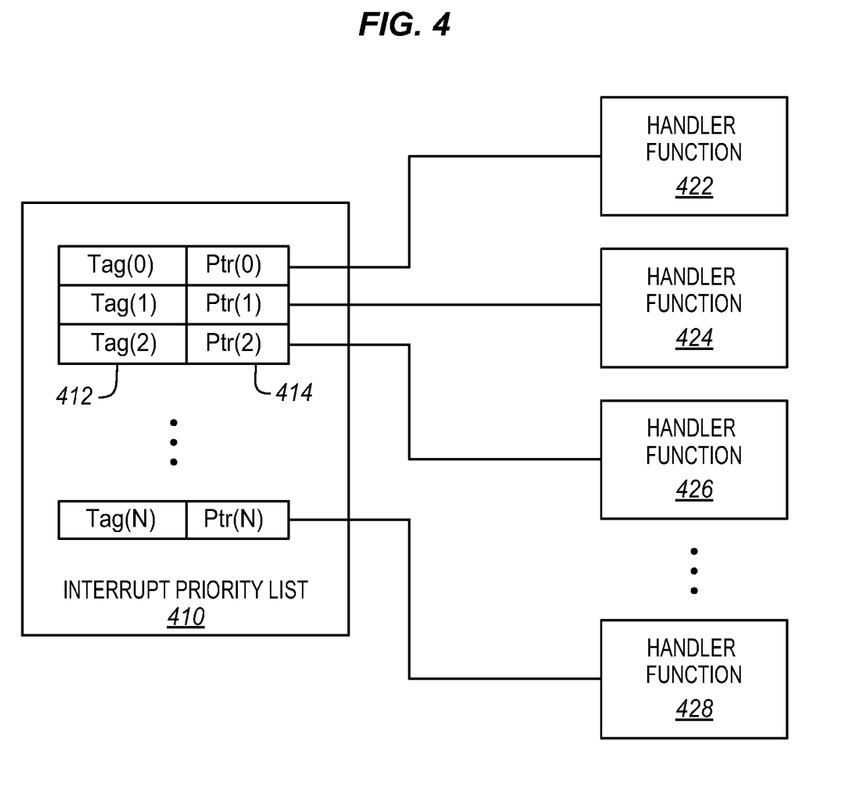
FIG. 4 illustrates an exemplary interrupt priority list utilized by a processor in accordance with features and aspects hereof.

FIG. 4 illustrates an exemplary IPL 410 utilized by a processor in accordance with features and aspects hereof. In prior systems, the processing order of the interrupts would be determined by static firmware. For example, a PIC would be programmed based upon firmware instructions to define the priority of each incoming interrupt. However, the PIC would be programmed by a processor based upon instructions in static firmware. In contrast, in FIG. 4 the processor is operable to detect an interrupt hit status (e.g., based upon interrupt registers in a PIC or input from the PIC) and to call an appropriate interrupt handler function for the interrupt based upon IPL 410 stored in interrupt memory. In this embodiment, IPL 410 comprises a series of list entries, and each entry is associated with an interrupt tag 412 and a pointer 414. An interrupt tag 412, may, for example, be a bitmask which matches a specific status of registers at a PIC. Upon detection of an interrupt, the processor traverses IPL 410 until it identifies a tag 412 that matches the interrupt. The processor then follows the pointer 414 associated with the tag for the interrupt in order to find a handler function 422-428 that is appropriate for the interrupt. The interrupt handler functions include instructions for processing the different types of incoming interrupts.

Figure 5:
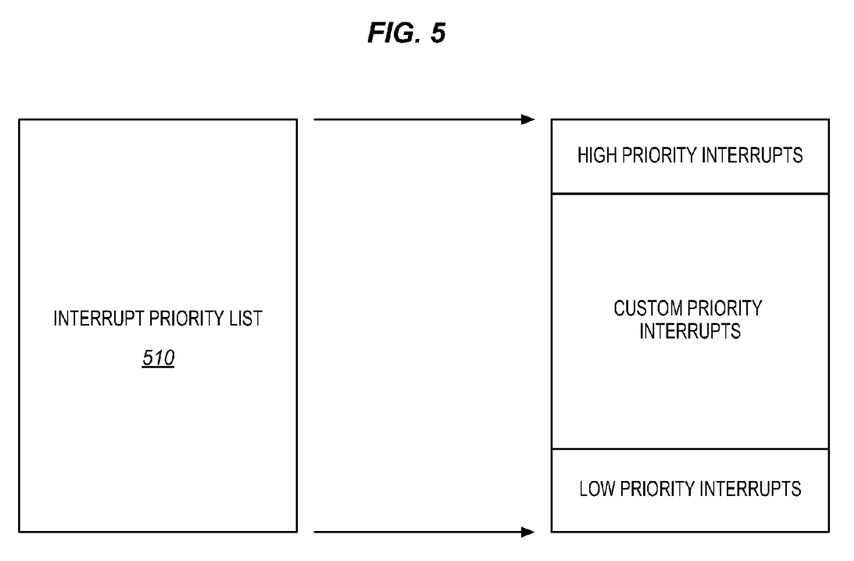
FIG. 5 illustrates an exemplary partially customizable interrupt priority list in accordance with features and aspects hereof.

FIG. 5 illustrates an exemplary partially customizable IPL 510 in accordance with features and aspects herein. Partially customizable IPLs may be desirable in situations wherein certain high-priority interrupts are common for large sets of customers. In this example, IPL 510 includes interrupts sorted according to three categories: high-priority, custom priority, and low priority. IPL 510 is designed so that a system user may modify custom priority interrupts, but may be restricted in some way or warned before modifying the priority of interrupts listed in the other two categories. This is desirable because altering certain interrupt priorities may result in unwanted or unexpected performance issues. Warning the user before modifying these priorities therefore ensures that interrupts are not processed in an inappropriate order by the storage system until a user is aware of the potential consequences. In one embodiment, an independent IPL exists for each of categories for high-priority interrupts, custom priority interrupts, and low priority interrupts, and the processor dynamically assembles the three IPLs into a single reference. In such embodiments, the (non-customizable) high-priority and low-priority IPLs may be stored in firmware as pre-compiled instructions at program memory 125, and then combined with a non-firmware custom priority IPL stored in interrupt memory 126. Examples of high priority interrupts may include SAS critical interrupts, DMA completions interrupts, and PCI Express interrupts. Examples of low priority interrupts may include UART interrupts, external GPIO interrupts, USB interrupts, and IIC interrupts.

Figure 6:
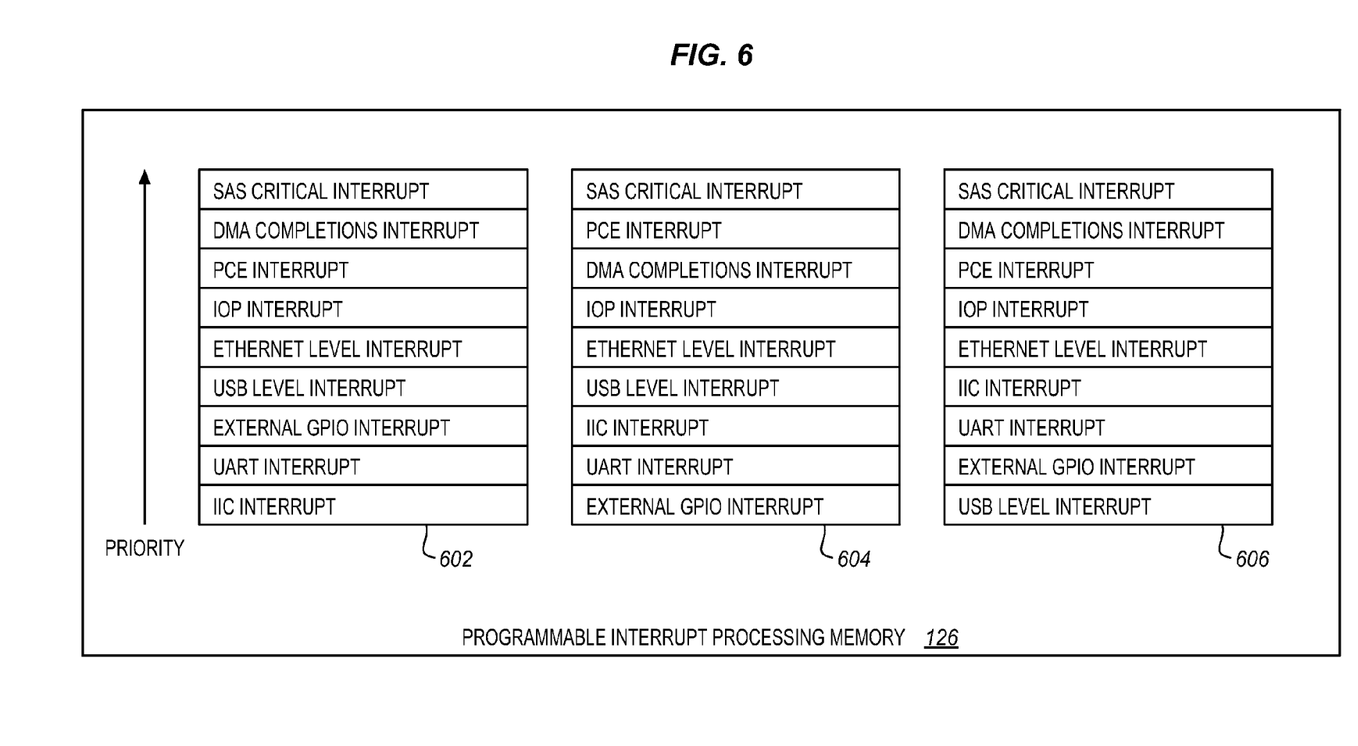
FIG. 6 illustrates multiple exemplary interrupt priority lists stored on an interrupt memory in accordance with features and aspects hereof.

FIG. 6 illustrates multiple exemplary Interrupt Priority Lists (IPLs) 602-606 stored on an interrupt memory 126 in accordance with features and aspects hereof. Each IPL 602-606 lists a different order of interrupt processing priorities. For example, IPL 602 gives DMA completion interrupts a higher priority than does IPL 604. In this embodiment, when a processor detects an interrupt, it accesses a location in interrupt memory 126 that points to an IPL. When the pointer is modified to point at a different IPL, the processor proceeds to access the different IPL. In this manner, entire sets of priorities may be changed "on the fly" without modifying the firmware instructions used to operate the processor. Typically, each of IPL's 602-606 will be stored in interrupt memory 126 so that it may be modified without taking the storage controller offline. In one embodiment, however, each priority list is stored in program memory 125, and only the pointer used to select a priority list is stored in interrupt memory 126. This may desirably reduce the amount of space taken in interrupt memory 126.

Figure 7:
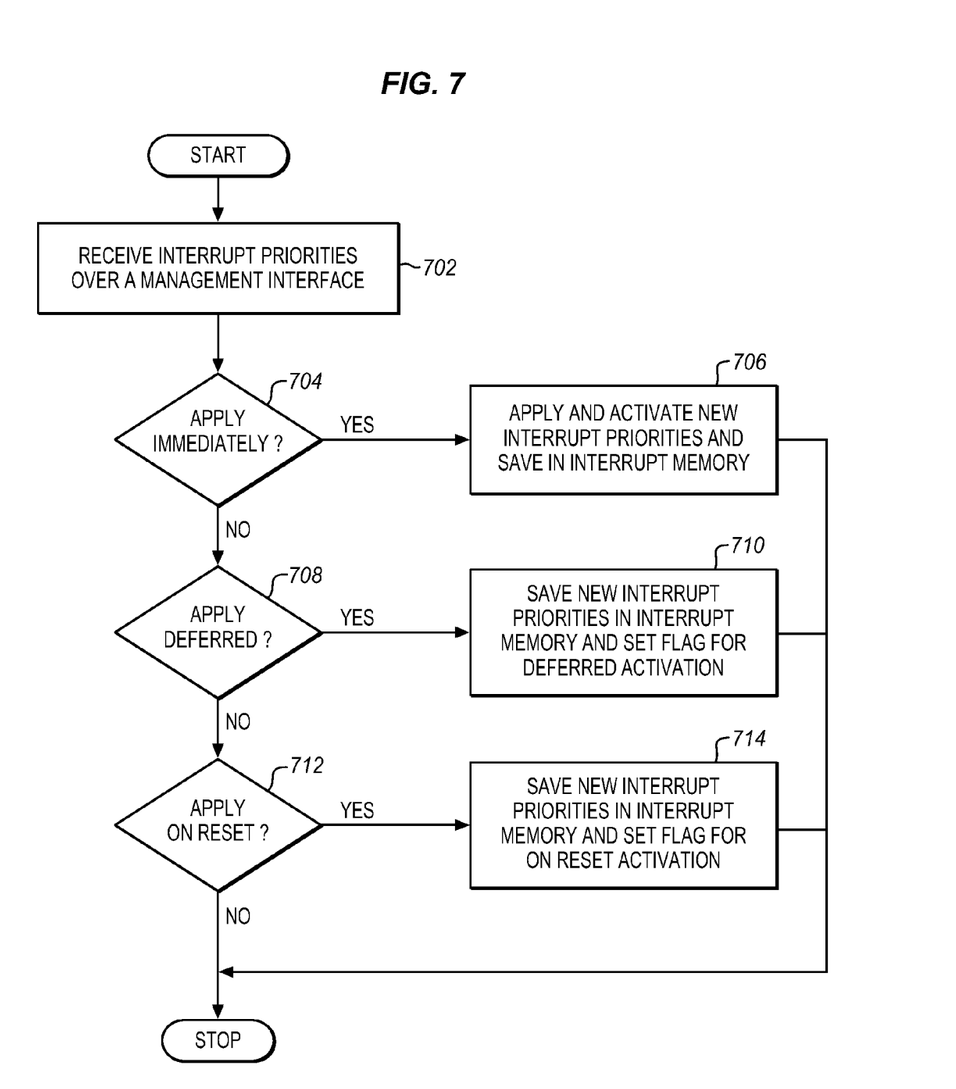
FIG. 7 illustrates an exemplary method for modifying interrupt priorities stored in memory in accordance with features and aspects hereof.

FIG. 7 illustrates an exemplary method for modifying interrupt priorities stored in memory in accordance with features and aspects hereof. The steps of FIG. 7 may illustrate further exemplary embodiments of steps 312-314 of FIG. 3. According to FIG. 7, in step 702, a processor of a storage system receives a new set of interrupt priorities via a management interface (although other interfaces may also be used). The processor then determines (e.g., based upon metadata associated with the new set of interrupt priorities, or based upon further incoming commands) at which time to apply the new set of interrupt priorities within the system. In step 704, the processor determines that the new priorities should be applied immediately. In this circumstance, processing continues to step 706, wherein the processor saves the new interrupt priorities in memory and activates them immediately. Thus, the processor immediately starts using the new interrupt priorities when processing incoming commands. In this circumstance, there may be a brief "jitter" in processing as the processor halts or ignores other tasks while activating the new set of interrupt priorities. If interrupt priorities are not desired to be modified immediately, processing continues onward to step 708 instead of step 706.

In step 708, the processor determines whether the new interrupt priorities should be applied on a deferred basis. If so, processing continues on to step 710. In step 710, the processor saves the new interrupt priorities in interrupt memory and sets a flag for deferred activation. These new priorities are not applied to process incoming interrupts until the processor reaches an idle condition, or some other desired condition is met. If interrupt priorities are not desired to be modified on a deferred basis, processing continues onward to step 712 instead of step 710.

In step 712, the processor determines whether the new interrupt priorities should be applied on a reset. If so, processing continues to step 714. According to step 714, the new interrupt priorities are stored in interrupt memory, and a flag is set so that the processor refrains from applying the new interrupt priorities to processing activities until after a reset has occurred.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A storage system, comprising:
a memory operable to store multiple sets of interrupt priorities, each set of interrupt priorities corresponding to a different configuration of the storage system;
a processor coupled with the memory, the processor operable to acquire and process incoming interrupts according to the interrupt priorities; and
an interface coupled with the processor, the interface operable to receive input and to transmit interrupt processing criteria to the processor based on the input,
wherein the processor is further operable to receive the interrupt processing criteria from the interface, to select one of the multiple sets of interrupt priorities based upon the interrupt processing criteria, and to implement the selected set of interrupt priorities without losing incoming processing requests for the storage system, and
wherein the processor is further operable to handle the incoming interrupts according to the implemented set of interrupt priorities.

2. The storage system of claim 1, further comprising:
a second memory coupled with the processor, the second memory operable to store instructions and data for execution by the processor.

3. The storage system of claim 1, wherein:
the memory comprises registers of a Programmable Interrupt Controller (PIC) coupled with the processor and coupled with a plurality of interrupt sources,
wherein the PIC is operable to multiplex signals from the plurality of interrupt sources according to the interrupt priorities stored in the memory to generate an interrupt signal applied to the processor.

4. The storage system of claim 1, further comprising:
a Programmable Interrupt Controller (PIC) coupled with the processor and coupled with a plurality of interrupt sources, the PIC operable to multiplex signals from the plurality of interrupt sources according to a programmable priority scheme stored in registers of the PIC to generate an interrupt signal applied to the processor,
wherein the processor is further operable to alter the programmable priority scheme to match the interrupt priorities of the memory.

5. The storage system of claim 1, wherein:
the processor is further operable to identify one of the multiple sets of interrupt priorities based upon a vendor identified by the interrupt processing criteria.

6. The storage system of claim 1, wherein:
the processor is further operable to identify one of the multiple sets of interrupt priorities based upon a configuration of the storage system.

7. The storage system of claim 1, wherein:
the processor occupies a storage system component that is not directly coupled with a storage system component that generated the input for changing the interrupt priorities.

8. A method comprising:
receiving, with a processor of a storage controller, incoming interrupts;
processing, with the processor, the incoming interrupts according to interrupt priorities stored in a memory that stores multiple sets of interrupt priorities, each set of interrupt priorities corresponding to a different configuration of the storage system;
receiving, with an interface, input describing interrupt processing criteria;
transmitting, via the interface, the interrupt processing criteria to the processor;
receiving, with the processor, the interrupt processing criteria;
selecting one of the multiple sets of interrupt priorities stored in the memory based upon the interrupt processing criteria;
implementing, with the processor, the selected set of interrupt priorities without losing incoming processing requests for the storage controller; and
processing, with the processor, the incoming interrupts according to the implemented set of interrupt priorities.

9. The method of claim 8,
wherein the memory comprises registers of a Programmable Interrupt Controller (PIC), wherein the method further comprises:
multiplexing, with the PIC, signals from a plurality of interrupt sources to generate an interrupt signal applied to the processor.

10. The method of claim 8, further comprising:
multiplexing, with a Programmable Interrupt Controller (PIC), signals from a plurality of interrupt sources to generate an interrupt signal applied to the processor according to a programmable priority scheme stored in registers of the PIC; and
altering, with the processor, the programmable priority scheme to match the interrupt priorities of the memory.

11. The method of claim 8, further comprising:
selecting one of the multiple sets of interrupt priorities based upon a vendor identified by the interrupt processing criteria.

12. The method of claim 8, further comprising:
selecting one of the multiple sets of interrupt priorities based upon a configuration of the storage controller.

13. A non-transitory computer readable medium embodying programmed instructions which, when executed by a processor, are operable for performing a method comprising:
receiving, with a processor of a storage controller, incoming interrupts;
processing, with the processor, the incoming interrupts according to interrupt priorities stored in a memory that stores multiple sets of interrupt priorities, each set of interrupt priorities corresponding to a different configuration of the storage system;
receiving, with an interface, input describing interrupt processing criteria;
transmitting, via the interface, the interrupt processing criteria to the processor;
receiving, with the processor, the interrupt processing criteria;
selecting one of the multiple sets of interrupt priorities stored in the memory based upon the interrupt processing criteria;
implementing, with the processor, the selected set of interrupt priorities without losing incoming processing requests for the storage controller; and
processing, with the processor, the incoming interrupts according to the implemented set of interrupt priorities.

14. The medium of claim 13,
wherein the memory comprises registers of a Programmable Interrupt Controller (PIC), wherein the method further comprises:
multiplexing, with the PIC, signals from a plurality of interrupt sources to generate an interrupt signal applied to the processor.

15. The medium of claim 14, wherein the method further comprises:
multiplexing, with a Programmable Interrupt Controller (PIC), signals from a plurality of interrupt sources to generate an interrupt signal applied to the processor according to a programmable priority scheme stored in registers of the PIC; and
altering, with the processor, the programmable priority scheme to match the interrupt priorities of the memory.

16. The medium of claim 13, wherein the method further comprises:
selecting one of the multiple sets of interrupt priorities based upon a vendor identified by the interrupt processing criteria.

17. The medium of claim 13, wherein the method further comprises:
selecting one of the multiple sets of interrupt priorities based upon a configuration of the storage controller.

* * * * *